(12) United States Patent
Price et al.

(10) Patent No.: US 12,396,085 B2
(45) Date of Patent: Aug. 19, 2025

(54) OPTIMIZATION OF A TARGET OF A DOWNHOLE NEUTRON GENERATOR

(71) Applicant: Halliburton Energy Services, Inc., Houston, TX (US)

(72) Inventors: James Martin Price, Cypress, TX (US); Ali E. Abdou, Spring, TX (US); Zilu Zhou, Needham, MA (US); Jimmy Wayne Anders, Montgomery, TX (US); Weijun Guo, Houston, TX (US); Lesley Allison Fessler, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 372 days.

(21) Appl. No.: 18/195,205

(22) Filed: May 9, 2023

(65) Prior Publication Data

US 2024/0381522 A1    Nov. 14, 2024

(51) Int. Cl.
*H05H 6/00* (2006.01)
*G01V 5/04* (2006.01)

(52) U.S. Cl.
CPC .................. *H05H 6/00* (2013.01); *G01V 5/04* (2013.01)

(58) Field of Classification Search
CPC .................................. H05H 6/00; G01V 5/04
See application file for complete search history.

(56) References Cited

U.S. PATENT DOCUMENTS

| | | | |
|---|---|---|---|
| 5,293,410 A | 3/1994 | Chen et al. | |
| 9,322,262 B2 | 4/2016 | Chirovsky et al. | |
| 10,502,861 B2 | 12/2019 | Navarro-Sorroche et al. | |
| 11,834,204 B1 * | 12/2023 | Gorokhovsky | B64G 1/413 |
| 2010/0040202 A1 | 2/2010 | Lee | |
| 2010/0266102 A1 | 10/2010 | Lee et al. | |

(Continued)

FOREIGN PATENT DOCUMENTS

WO    2006069009 A2    6/2006

OTHER PUBLICATIONS

International Search Report & Written Opinion; PCT Application No. PCT/US2023/021648; mailed Feb. 6, 2024.

(Continued)

*Primary Examiner* — Nicole M Ippolito
(74) *Attorney, Agent, or Firm* — NOVAK DRUCE CARROLL LLP

(57) ABSTRACT

Systems and techniques are provided for optimizing the performance of a target for a downhole neutron generator. An example method can include disposing a first source material and a first substrate in a vacuum chamber at an initial temperature, evaporating the first source material to be deposited onto a surface of the first substrate, monitoring a temperature of the first substrate during the evaporation of the first source material, and determining a thermal equilibrium process temperature at which the temperature of the first substrate is stabilized. The example method can further include disposing a second source material and a second substrate in the vacuum chamber at the thermal equilibrium process temperature, evaporating the second source material to be deposited onto a surface of the second substrate, and obtaining the second substrate deposited with the second source material for a target of a downhole neutron generator.

20 Claims, 8 Drawing Sheets

(56) References Cited

U.S. PATENT DOCUMENTS

2012/0043483 A1* 2/2012 Bowen, III ............... G21F 1/02
 250/517.1
2018/0246250 A1 8/2018 Navarro Sorroche et al.

OTHER PUBLICATIONS

Abstract of Guo, Wen-Ting et al. "Impact of the target material surface layer on neutron yield and target lifetime of the neutron tube", Radiation Physics and Chemistry; May 8, 2021, vol. 186, No. 109548, pp. 1-8.
Abstract of Ellis, Darwin et al., "Well Logging for Earth Scientists", Springer Science & Business Media, Jun. 29, 2007—Science—708 pages.
Abstract of Csikai, G J., "CRC handbook of fast neutron generators", United States: N. p., Jan. 1, 1987.
Abstract of Reifenschweiler, O., "Sealed-Off Neutron Tube: the Underlying Research Work", Journal Philips Res. Rept., vol. 16; Oct. 1, 1961.
Schlumberger; Litho Scanner, High-definition spectroscopy service brochure; retrieved from https://www.slb.com/-/media/files/fe/brochure/litho-scanner-br.ashx on May 8, 2023.
Schlumberger; Pulsar Multifunction spectroscopy service brochure; retrieved from https://www.slb.com/-/media/files/fe/brochure/pulsar-spectroscopy-br.ashx on May 8, 2023.
Halliburton; RMT-3D™ Reservoir Monitor Tool for Oil, Water, and Gas Saturation; retrieved from https://www.halliburton.com/en/products/reservoir-monitor-tool-3-detector on May 8, 2023.
Abstract of Chen, Jianxing et al., "A new Cased-Hole 2 1/8-In. Multi-Detector Pulsed-Neutron Tool: Theory and Characterization", Paper presented at the SPWLA 56th Annual Logging Symposium, Long Beach, California, USA, Jul. 2015; SPWLA-2015-AAA; Jul. 18, 2015.
Mott, N.F., "The Theory of Atomic Collisions", Digital Library of India Item 2015.3748; 1949.
Kim, Y.K et al., "Electron-Impact Cross Sections for Ionization and Excitation Database", DOI: https://dx.doi.org/10.18434/T4KK5C ; NIST: Physical Measurement Laboratory; retrieved from https://www.nist.gov//pml/electron-impact-cross-sections-ionization-and-excitation-database on May 8, 2023.

* cited by examiner

OPTIMIZATION OF A TARGET OF A DOWNHOLE NEUTRON GENERATOR

TECHNICAL FIELD

The present disclosure generally relates to downhole neutron generators. For example, aspects of the present disclosure relate to systems and techniques for optimizing the performance of a target of a downhole neutron generator.

BACKGROUND

Wells are drilled at various depths to access and produce hydrocarbons such as oil and gas from subterranean geological formations. Particularly, hydrocarbons may be produced from a wellbore that traverses one or more subterranean formations. In the process of completing such a wellbore, modern drilling operations may include gathering information relating to the conditions encountered downhole. Such information typically includes characteristics of the formations traversed by the borehole, and data relating to the characteristics of the borehole itself. The collection of information can be performed by several methods, including wireline logging, logging while drilling (LWD), measurement while drilling (MWD), drill pipe conveyed logging, and coil tubing conveyed logging.

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various formation characteristics are measured and correlated with the position of the sonde in the borehole as the sonde is pulled uphole toward the surface.

In LWD or MWD, a drilling assembly includes sensing instruments that measure various parameters of the formation during drilling. While LWD and MWD techniques allow formation measurements to be taken during drilling, drilling operations may create an environment that is hostile to electronic instrumentation or sensor operations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
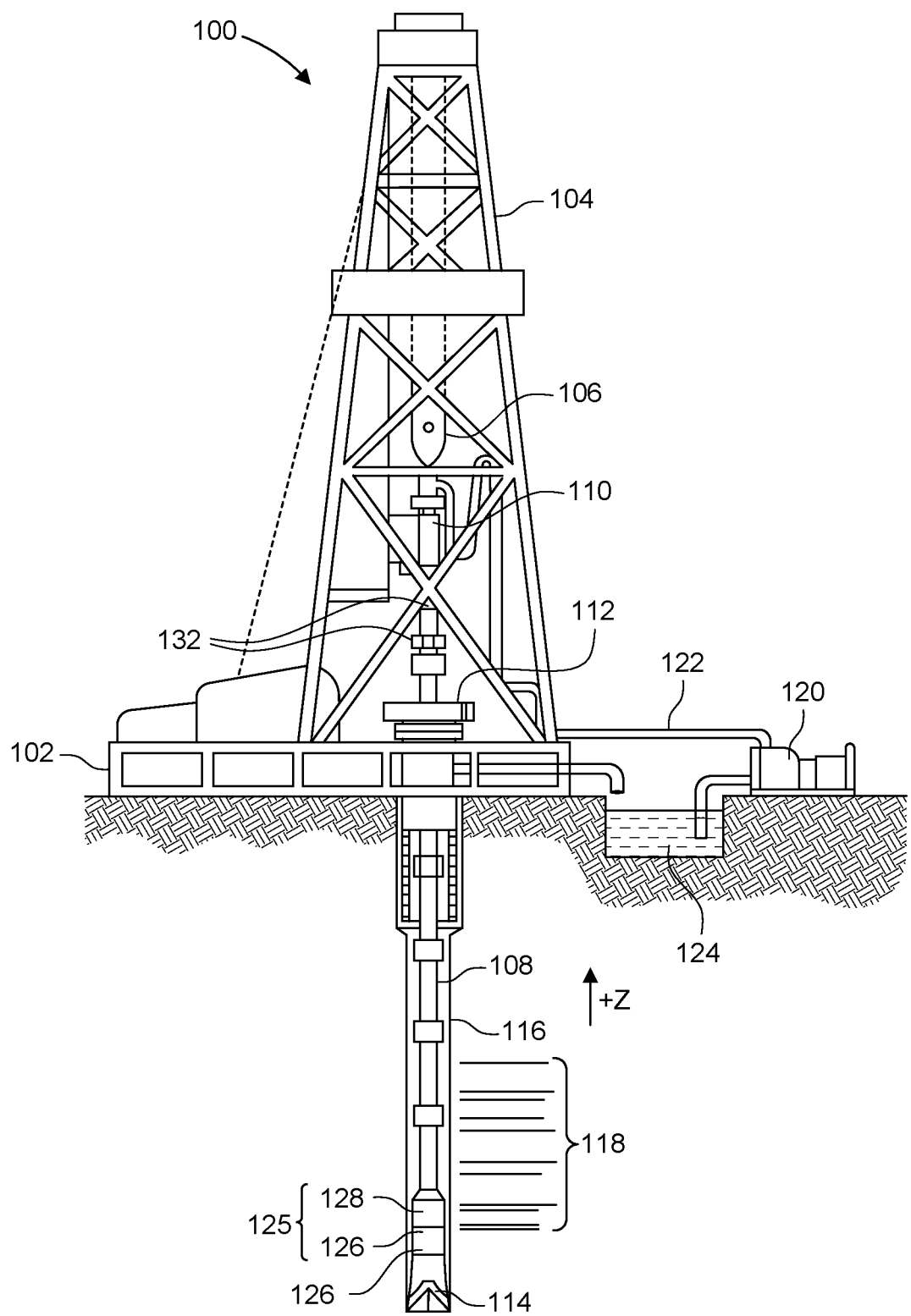
FIG. 1A is a schematic side-view of an example LWD logging environment, according to some examples of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously described, wellbore drilling and/or operation can involve gathering information related to downhole geological formations of the wellbore. In some cases, a compact deuterium (D) and tritium (T) neutron generator can be used in a downhole nuclear logging tool for oil and gas well measurements. The neutron generator can include a sealed tube as vacuum housing, a gas reservoir for storing D/T gas, an ion source for generating ions that are accelerated by a high voltage system, and a target for facilitating the DT fusion reactions to generate neutrons.

Since $D_2$, $T_2$, or a mixture of $D_2$ and $T_2$ is in a gaseous form, a target of a neutron generator comprises a thin metal film where the gas can be absorbed. The metal film of a target can be a thin layer (e.g., a layer of Titanium) deposited on a copper structure (e.g., block or rod), which can be used not only for mechanical support and electrical connection but also for transferring the heat generated by the ion bombardment at the metal film to outside the vacuum housing (e.g., sealed tube) for dissipation.

A metal film of a target may directly affect the performance of a neutron generator depending on the density, uniformity, adhesion, or any other qualities of the film. For example, the gas concentration inside the film may determine the neutron yield, or the thickness of the metal film can affect the lifetime of the neutron generator due to erosions caused by the ion beam sputtering. As follows, the quality of the film of a target is closely related to the performance of a neutron generator. When a commonly used Titanium is deposited onto a copper rod to form a film, the film tends to lack adhesion, has a high sputtering rate, has large grain boundaries affecting gas loading, and is not sufficiently dense as compared to stoichiometric Titanium. Since the coefficient of thermal expansion (CTE) is different between the two metals (e.g., Ti and Cu), there are challenges associated with having a solid adhesion.

Systems, apparatuses, processes (also referred to as methods), and computer-readable media (collectively referred to as "systems and techniques" or "system") are described herein for optimizing the performance of a target of a neutron generator. In some examples, the systems and techniques described herein can improve the performance of a target by depositing a target film based on a Physical Vapor Deposition (PVD) technique such as an electron beam evaporation process or a thermal evaporation process.

In some examples, the systems and techniques can improve the target performance via an electron beam evaporation process. For example, a thermal equilibrium process temperature (e.g., a process temperature) for the electron beam evaporation process can be optimized to match the thermal kinetics of the deposition of a film material (e.g., Titanium, Scandium, etc.) onto a copper structure. In some aspects, the systems and techniques can determine a thermal equilibrium process temperature during an electron beam evaporation process and use the thermal equilibrium process temperature to form a film (e.g., a layer of Titanium) deposited onto a backing structure (e.g., copper rod) for a target of a neutron generator. In some cases, the thermal equilibrium process temperature can vary depending on a geometry of a vacuum chamber, a pressure within the vacuum chamber, a deposition rate, etc. For example, an optimal process temperature that matches the thermal kinetics of the e-beam evaporation process can help obtain a target (e.g., a target comprising a thin metal film deposited onto a copper structure) that is dense and is or is close to defect-free.

In some examples, the systems and techniques can increase the D/T gas concentration inside the film (e.g., Titanium layer), which can result in increased neutron yields. Also, the systems and techniques can deposit a thicker film (e.g., Titanium layer), which then allows a target to be long-lasting under erosion and therefore a longer lifetime of a neutron generator (e.g., a neutron tube).

The systems and techniques of the present disclosure relate to a neutron generator that may be used in wireline, MWD, LWD, and other logging operations. The neutron generator uses an ion source that generates an intensive ion beam, to bombard an improved film target, resulting in enhanced lifespan and neutron yield. In some aspects, the neutron generator may be a pulsed neutron generator.

Examples of the systems and techniques described herein are illustrated in FIG. 1A through FIG. 7 and described below.

The disclosed neutron generator and associated systems and methods are described in the context of the larger systems in which they operate. Accordingly, FIG. 1A is a diagram illustrating an example LWD environment 100, according to some examples of the present disclosure. As shown, in this example, a drilling platform 102 supports a derrick 104 that has a traveling block 106 for raising and a lowering drill string 108. A kelly 110 supports the drill string 108 as it is lowered through a rotary cable 112. A drill bit 114 is driven by a downhole motor and/or rotation of the drill string 108. As a drill bit 114 of the drill string 108 rotates, it drills a borehole 116 that passes through one or more formations 118. A pump 120 circulates drilling fluid through a feed pipe 122 to the kelly 110 downhole through the interior of the drill string 108 and orifices in the drill bit 114, back to the surface via the annulus around the drill string 108 and into a retention pit 124. The drilling fluid transports cuttings from the borehole into pit 124 and aids in maintaining borehole integrity.

The drill bit 114 may be one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, and various formation measurements. In some examples, such a logging instrument includes a pulsed neutron generator and measurement device that creates a neutron log.

In addition to using sensors to determine formation measurements and other properties, other sensor equipment may be included either in the drill collars or anywhere along the drill string 108 to collect information about the geological formation that is being drilled. Thus, an illustrative logging tool that includes a neutron generator, such as the downhole tool 126, may be positioned near the drill bit 114 or connected further up the drill string 108. The downhole tool 126 may include a signal generator and a receiver where the signal generator is the neutron generator and the receiver is a sensor for sensing scattered neutron radiation from formation 118.

In some examples, a downhole tool 126 can take the form of a drill collar (e.g., a thick-walled tubular that provides weight and rigidity to aid the drilling process) or any other known and/or suitable arrangement. Further, the downhole tool 126 can include one or more logging tools such as, for example and without limitation, one or more acoustic (e.g., sonic, ultrasonic, etc.) logging tools and/or one or more other types of logging tools and/or corresponding components. The downhole tool 126 can be integrated into a bottom-hole assembly 125 near the drill bit 114. As the drill bit 114 extends the borehole through formations, the bottom-hole assembly 125 can collect logging data and/or sensor data (e.g., NMR data and/or any other logging and/or sensor data). The downhole tool 126 can include transmitters (e.g., monopole, dipole, quadrupole, etc.) to generate and transmit signals/waves into the borehole environment such as, for example and without limitation, acoustic signals/waves, radio frequency (RF) signals/waves, optical signals/waves, and/or any other signals/wavs. These signals/waves propagate in and along the borehole and the surrounding formation(s) and create signal responses or waveforms, which are received/recorded by one or more receivers.

For purposes of communication, a downhole telemetry sub 128 can be included in the bottom-hole assembly 125 to transfer measurement data to a surface receiver 132 and receive commands from the surface (e.g., from a device at the surface such as a computer and/or a transmitter). Mud pulse telemetry is one example telemetry technique for transferring tool measurements to surface receivers and receiving commands from the surface. However, other telemetry techniques can also be used. Other, non-limiting example telemetry techniques that can be implemented can include fiber optic telemetry, electric telemetry, acoustic telemetry through the pipe, and electromagnetic (EM) telemetry, among others. In some aspects, the telemetry sub 128 can store logging data for later retrieval at the surface when the logging assembly is recovered.

At the surface, the surface receiver 132 can receive the uplink signal from the downhole telemetry sub 128. The surface receiver 132 can include, for example and without limitation, a wireless receiver, a computer (e.g., a laptop computer, a desktop computer, a tablet computer, a server computer, and/or any other type of computer), and/or any other device with data communication capabilities (e.g., wired and/or wireless). In some cases, the surface receiver 132 can communicate the signal from the downhole telemetry sub 128 to a data acquisition system (not shown). Such a data acquisition system can be part of the surface receiver 132 or can be a separate device such as, for example, a computer, a storage device, etc. The surface receiver 132 can include one or more processors, storage devices, input devices, output devices, memory devices, software, and/or the like. The surface receiver 132 can collect, store, and/or process the data received from tool 126 as described herein.

In some examples, the surface receiver 132 can include a single receiver or multiple receivers. In some cases, the surface receiver 132 can include a set of evenly spaced receivers or a set of receivers in any other arrangement. The surface receiver 132 can include a number of receivers arranged in an array and/or evenly spaced (or spaced in any other configuration/arrangement) apart to facilitate capturing and processing response signals at specific intervals. The response signals/waves can be analyzed to determine borehole and adjacent formation properties and/or characteristics. Depending on the implementation, other logging tools may be deployed. For example, logging tools configured to measure electric, nuclear, gamma and/or magnetism levels may be used. Logging tools can also be implemented to measure other properties, events, and/or conditions such as, for example and without limitation, pressure, measure fluid viscosity, measure temperature, perform fluid identification, measure a tool orientation, and/or obtain any other measurements.

At various times during the process of drilling a well, the drill string 108 may be removed from the borehole 116. Logging operations can be conducted using the downhole tool 126 (e.g., a logging tool, a sensing instrument sonde, etc.) suspended by a different conveyance. In one or more examples, the conveyance can be or include a cable having conductors for transporting power to the tool and telemetry from the tool to the surface. In some examples, the downhole tool 126 can have pads and/or centralizing springs to maintain the tool near the central axis of the borehole or to bias the tool towards the borehole wall as the tool is moved downhole or uphole.

In some examples, the downhole tool 126 can include an acoustic or sonic logging instrument that collects acoustic logging data within the borehole 116. As mentioned above, other logging instruments may additionally or alternatively be used. A logging facility can include a computer system, such as the computer system 700 described with reference to FIG. 7, for collecting, storing, and/or processing the data/measurements gathered by the downhole tool 126.

In one or more examples, a conveyance of the downhole tool 126 may include at least one of wires, conductive and/or non-conductive cable (e.g., slickline, etc.), and/or tubular conveyances such as coiled tubing, pipe string, or downhole tractor. In some cases, the downhole tool 126 can have a local power supply, such as batteries, a downhole generator, and/or the like. When employing a non-conductive cable, coiled tubing, pipe string, or a downhole tractor, communication can be supported using, for example, wireless protocols (e.g., EM, acoustic, etc.), and/or measurements and logging data may be stored in local memory for subsequent retrieval. In some aspects, electric or optical telemetry is provided using conductive cables and/or fiber optic signal-paths.

Figure 1B:
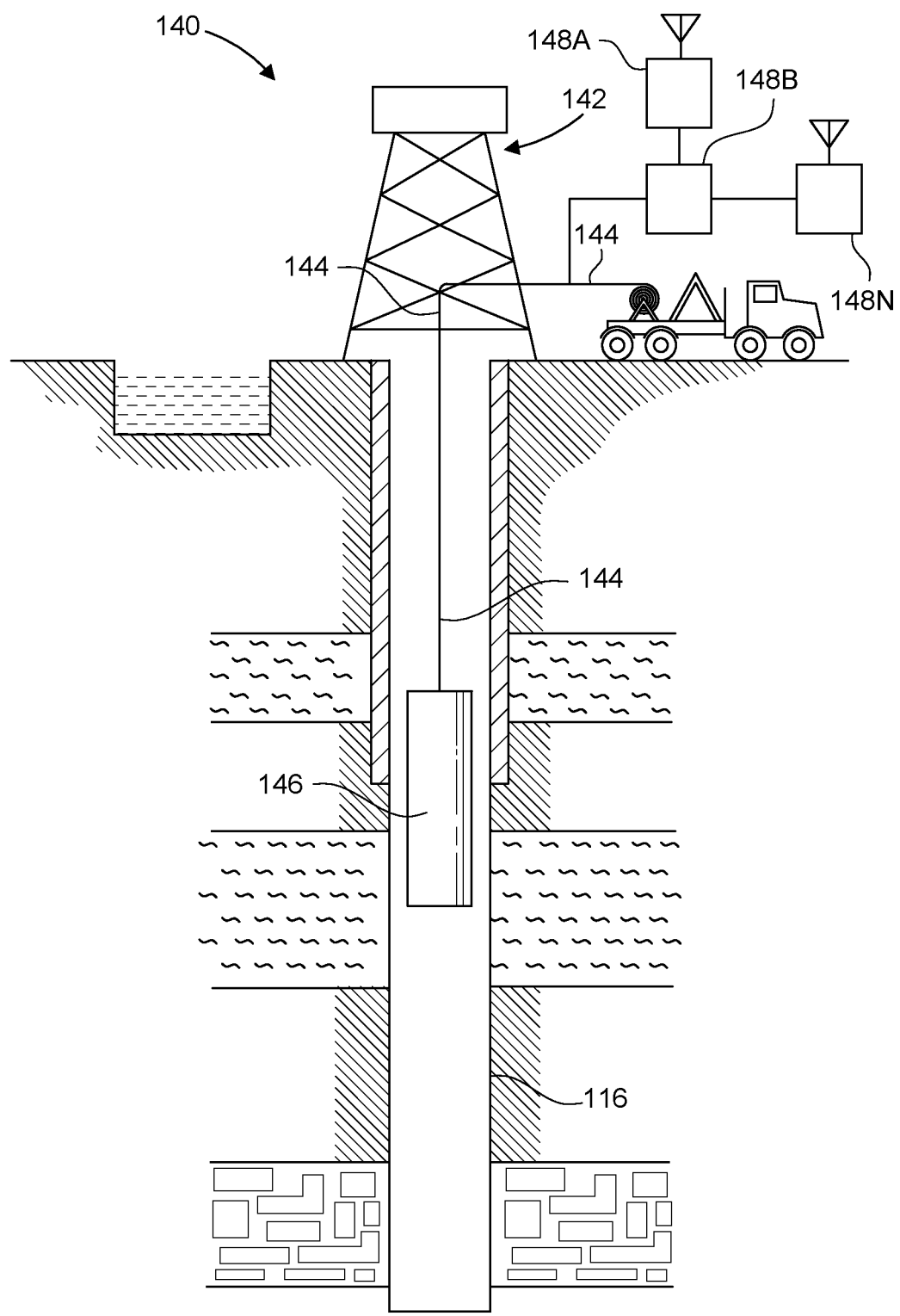
FIG. 1B is a schematic side-view of the example wireline logging environment, according to some examples of the present disclosure.

Referring to FIG. 1B, a tool having tool body 146 can be employed with "wireline" systems 140, in order to carry out logging or other operations. For example, instead of using the drill string 108 of FIG. 1A to lower tool body 146, which may contain sensors or other instrumentation for detecting and logging nearby characteristics and conditions of the wellbore and surrounding formation, the tool body 146 can be lowered by a wireline conveyance 144. Thus, as shown in FIG. 1B, the tool body 146 can be lowered into the borehole 116 (e.g., wellbore) by the wireline conveyance 144. The wireline conveyance 144 can be anchored in a drill rig 142 or portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 can provide support for the tool (e.g., tool body 146), enable communication between the tool processors on the surface, and/or provide a power supply. The wireline conveyance 144 can include fiber optic cabling for carrying out communications. The wireline conveyance 144 can be sufficiently strong and flexible to tether the tool body 146 through the borehole 116 (e.g., wellbore), while also permitting communication through the wireline conveyance 144 to one or more local processors 148B and/or one or more remote processors 148A, 148N. Power can be supplied via the wireline conveyance 144 to meet power requirements of the tool. For slickline or coiled tubing configurations, power can be supplied downhole with a battery or via a downhole generator, for example.

Similar to the downhole tool 126 described with regard to FIG. 1A, the tool having tool body 146 may contain a neutron generator either exclusively or in combination with other sensors and instruments.

Although FIGS. 1A and 1B depict specific borehole configurations, it should be understood that the present disclosure is suited for use in wellbores having other orientations including vertical wellbores, horizontal wellbores, slanted wellbores, multilateral wellbores, and the like. While FIGS. 1A and 1B depict an onshore operation, it should also be understood that the present disclosure is suited for use in offshore operations. Moreover, the present disclosure is not limited to the environments depicted in FIGS. 1A and 1B, and can also be used in other well operations such as, for example and without limitation, production tubing operations, jointed tubing operations, coiled tubing operations, combinations thereof, and/or the like.

Figure 2:
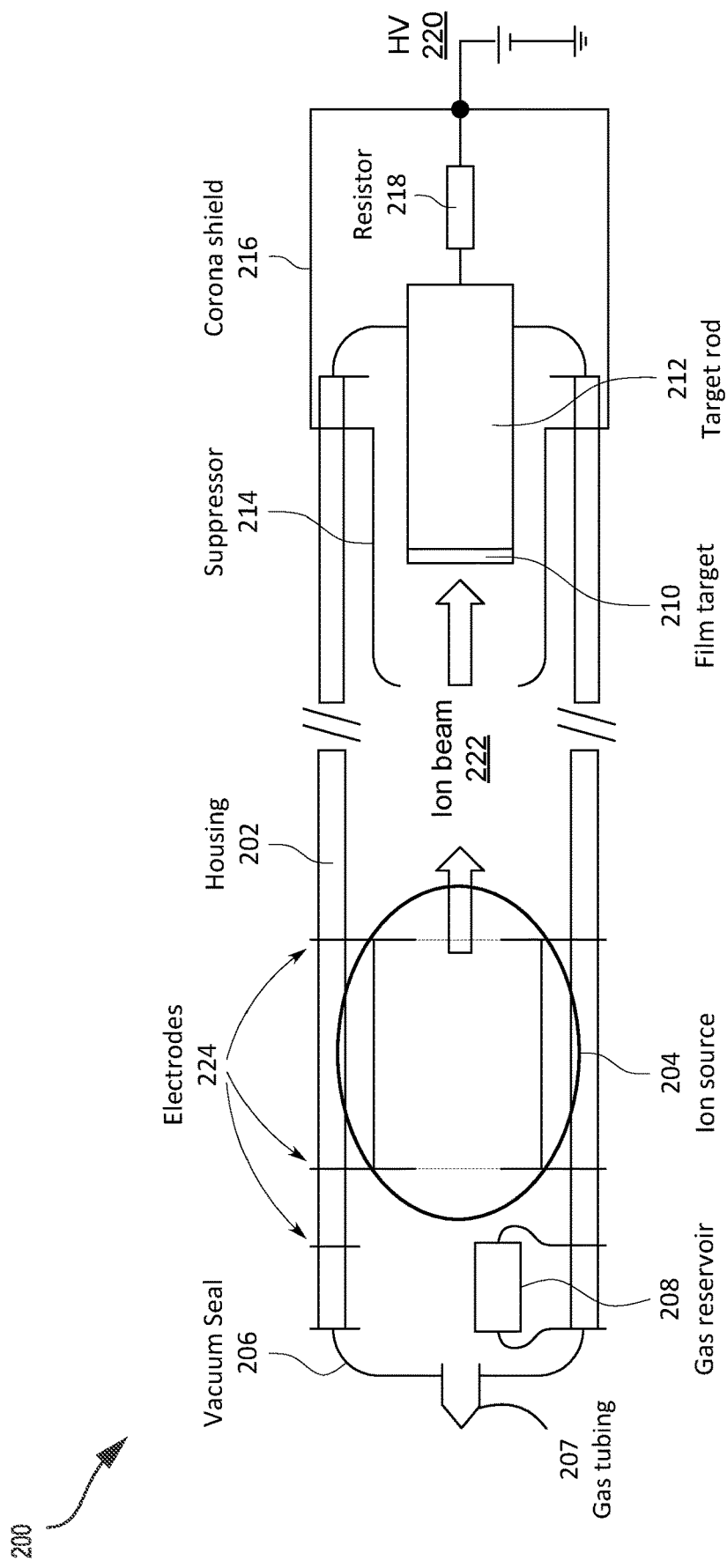
FIG. 2 is a diagram of a neutron generator that includes an ion source and a target, in accordance with aspects of the present disclosure.

FIG. 2 is a diagram of a neutron generator 200 that includes an ion source 204 and a target (e.g., film target 210 and target rod 212), in accordance with aspects of the present disclosure. As previously described, the downhole tool 126 as illustrated in FIG. 1A or the tool having tool body 146 as illustrated in FIG. 1B can include the neutron generator 200 in addition to sensors and other hardware and/or software.

In some cases, neutron generator 200 can include a housing 202 (e.g., vacuum housing or cylindrical vacuum housing) that can be used to form a sealed tube. In some examples, the housing 202 of neutron generator 200 can include one or more ceramic housing rings (e.g., used as insulating spacers) and one or more metal washers (e.g., used as electrodes 224) in a brazed stack.

In some aspects, neutron generator 200 can be filled with a mixture of $D_2$ and $T_2$ gas, which can be stored in gas reservoir 208. In some cases, neutron generator 200 can include ion source 204 that can use the gas stored in gas reservoir 208 to generate ion beam 222. In some examples, ion beam 222 can be directed at a target that can include film target 210 and target rod 212. In some cases, film target 210 can be coated onto or otherwise attached to target rod 212 (further details regarding the deposition of a material of film target 210 onto target rod 212 are discussed below with respect to FIGS. 3A-6). In some cases, target rod 212 can be made of copper and may be used as a backing structure. In some configurations, film target 210 can include a Titanium layer that is saturated with the D-T gas (e.g., same gas stored in gas reservoir 208). In some cases, film target 210 can include a multi-layer of Scandium and Titanium.

In some instances, the target rod 212 can act as an electrical connector to a high voltage (HV) source 220 and a thermal conductor to transfer heat away from the target. That is, $D_2$ and $T_2$ atomic and molecular ions can be generated or emitted by the ion source 204 and can be accelerated to bombard the film target 210, which is loaded with the same gas. In some aspects, the D-T, or T-D fusion reactions can occur at a high voltage (e.g., supplied by HV source 220) in order to generate neutrons. For example, when ions of ion beam 222 collide with D and/or T atoms in film target 210, energetic neutrons (N) are created and escape in random, symmetrical directions from film target 210 towards the surrounding environment, which may be a subsurface formation. As follows, when neutron generator 200 is part of a subterranean logging tool (e.g., downhole tool 126 as illustrated in FIG. 1A or tool having the tool body 146 as illustrated in FIG. 1B), the neutrons are ejected into a surrounding formation to enable evaluation of physical characteristics of the subsurface formation.

In some cases, neutron generator 200 may also include a resistor 218 that can be connected between the target rod 212 and the HV source 220. In some aspects, the HV source 220 may be coupled to a corona shield 216 that can connect to a suppressor 214. For example, corona shield 216 can be coupled outside of housing 202 and provide a connection to suppressor 214. In some configurations, the suppressor 214 can be configured to reject or suppress low-energy, secondary emission electrons. In further examples, the suppressor 214 can trap ions that reflect or scatter from film target 210 on target rod 212 (e.g., backscattered ions). That is, the suppressor 214 may surround or enclose a portion of film target 210 and target rod 212 to suppress backscattered ions and secondary emission electrons within the housing 202 of neutron generator 200.

In some examples, neutron generator 200 can include a vacuum seal 206 (e.g., an end cap structure) that can be used to seal the vacuum enclosure. In some cases, the vacuum seal 206 may include a tubing structure 207 (e.g., copper tubing) that can be connected to a vacuum pumping and gas handling system for neutron tube processing. In some aspects, the tubing structure 207 that is part of vacuum seal 206 can be used to load gas into gas reservoir 208. In some cases, the neutron generator 200 can be sealed after the tubing structure 207 is pinched off from its connection to the gas handling system once the required amount of gas has been loaded into gas reservoir 208.

Figures 3A, 3B:
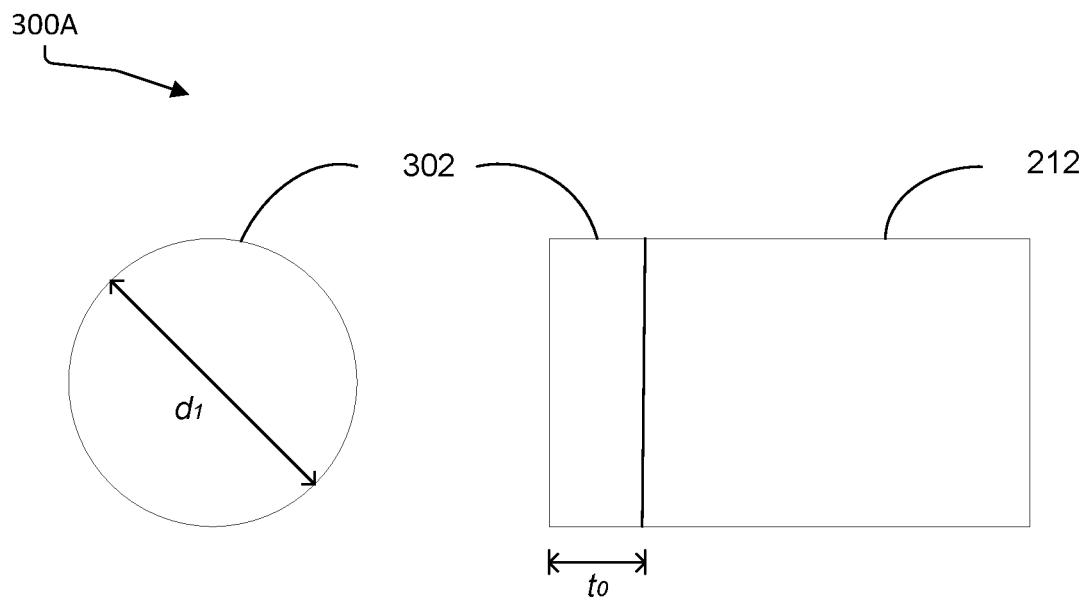
FIGS. 3A and 3B illustrate an example of a target with a layer of Titanium, according to some aspects of the disclosed technology.

FIGS. 3A and 3B illustrate an example of a target 300A with a layer of Titanium. FIG. 3A is a front view, as observed from an incident beam, of a Titanium (Ti) film layer 302 with a diameter $d_1$ (e.g., in a range of 5 to 25 mm). FIG. 3B is a side view of target 300A comprising Ti film layer 302 (e.g., film target 210) with thickness of to (e.g., in a range from 1 to 7 μm) attached or coated onto target rod 212.

Figures 3C, 3D:
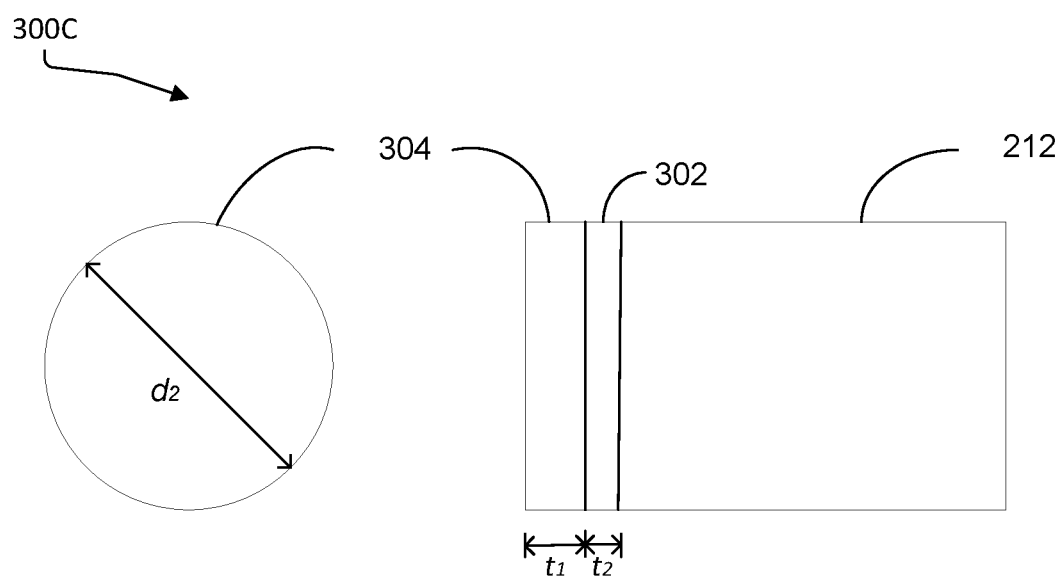
FIGS. 3C and 3D illustrate an example of a target with a multi-layer of Scandium and Titanium, according to some aspects of the disclosed technology.

FIGS. 3C and 3D illustrate an example of a target 300C with a multi-layer of Scandium and Titanium. FIG. 3C is a front view, as observed from an incident beam, of a Scandium (Sc) film layer 304 with a diameter $d_2$ (e.g., in a range from 5 to 25 mm). FIG. 3D is a side view of target 300C comprising a multi-layer (e.g., film target 210) that includes Sc film layer 304 with thickness of $t_1$ (e.g., in a range from 1 to 7 μm) and Ti film layer 302 with thickness of $t_2$ (e.g., in a range from 0.1 to 5 μm). As shown, the multi-layer of target 300C is attached or coated onto target rod 212. A process of depositing Ti film layer 302 or a multi-layer of Sc film layer 304 and Ti film layer 302 onto target rod 212 is described in detail with respect to FIGS. 4-6.

Figure 4:
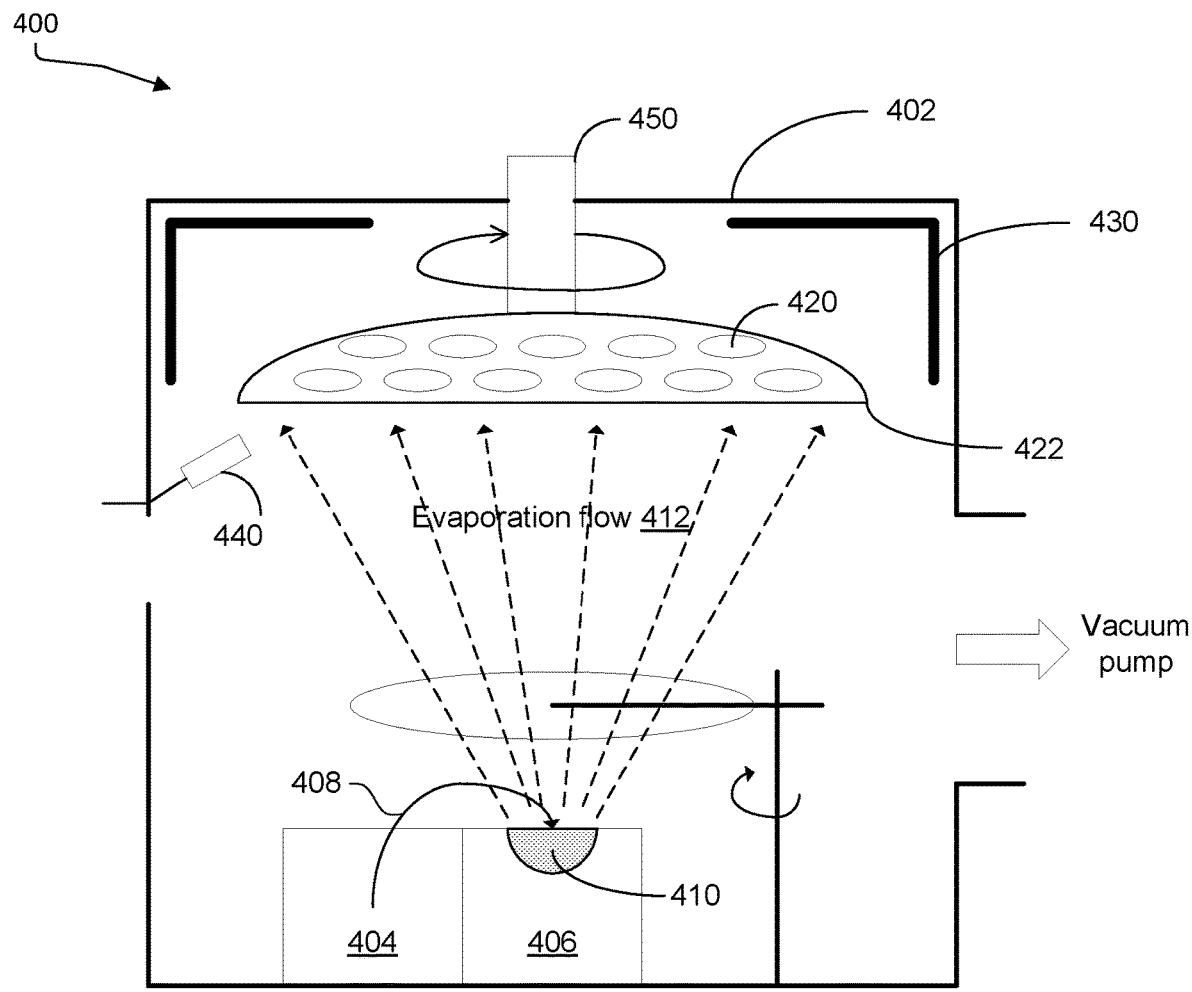
FIG. 4 illustrates an example of an electron beam evaporation machine, according to some aspects of the disclosed technology.

FIG. 4 illustrates an example of an electron beam (e-beam) evaporation machine 400 to deposit a metal film (e.g., film target 210) onto a copper structure (e.g., target rod 212) via an e-beam evaporation process. The systems and techniques of the present disclosure can provide an optimized deposition process that improves the quality of the film (e.g., film target 210) deposited on a copper structure (e.g., target rod 212) at a desired thickness as a target for a neutron generator (e.g., neutron generator 200).

As shown, e-beam evaporation machine 400 comprises a vacuum chamber 402. According to some aspects of the present technology, the e-beam evaporation process uses an electron beam 408 generated from an electron source 404 in vacuum chamber 402 to irradiate an evaporation material 410 in a crucible 406. And evaporation material 410 is heated, and evaporated, and forms a thin film on a substrate 420. For example, evaporation flow 412 condenses onto the surface of substrate 420 located at the top of vacuum chamber 402. Also, the substrate 420 can be heated (e.g., by a heater 430 in vacuum chamber 402) to a desired temperature. As evaporation flow 412 condenses onto the surface of substrate 420, the temperature of substrate 420 increases. This process temperature increase can be determined by a technique described below. Then the set temperature of substrate 420 can be adjusted by the heater 430.

In some examples, a shaft 450 rotates a substrate dome 422 at a specific speed, so that particles are evenly distributed along the surface of substrate 420. In some aspects, the thickness of a film deposited onto substrate 420 can be monitored throughout the deposition process by using crystal thickness monitor 440 (e.g., a quart crystal microbalance (QCM) deposition monitor, a crystal-type film thickness meter, etc.). For example, crystal thickness monitor 440 can measure the thickness of the deposited film by tracking the frequency response of a quartz crystal during the deposition process.

In some aspects, the systems and techniques of the present technology utilize the e-beam evaporation process in two steps to generate a target of a neutron generator that can optimize the performance of the neutron generator (e.g., neutron yield, lifetime, stability, etc.). The systems and techniques can perform the first e-beam evaporation process to determine a thermal kinetic saturation point (also referred to as a process temperature or a thermal equilibrium process temperature) in vacuum chamber 402. For example, a sample source material can be placed as evaporation material 410 in crucible 406. The sample source material can be any material that is desired to be deposited onto a copper rod as a thin metal film (e.g., film target 210 of neutron generator 200). Examples of the sample source material can include Titanium and/or Scandium. Also, a sample substrate (e.g., Copper) can be placed on substrate dome 422. The sample substrate can be any material that is desired to be used as a target rod (e.g., target rod 212 of neutron generator 200). An example of the sample substrate can include copper.

According to the e-beam evaporation process as described above, the sample source material (e.g., Ti and/or Sc) can be heated by the electron beam and evaporated so that Ti and/or Sc can be coated onto the sample substrate (e.g., copper rod). During the first e-beam evaporation process, the substrate 420 can be initially heated (e.g., by a heater 430 in vacuum chamber 402) to a pre-determined temperature, which subsequently can be monitored. When the temperature of substrate 420 is stabilized and remains constant over a prolonged deposition time period, the systems and techniques of the present disclosure can determine the temperature as a thermal kinetic saturation point (also referred to as a thermal equilibrium process temperature or a process temperature). In some cases, the systems and techniques can determine the difference between the initial temperature of substrate 420 and the final process temperature of substrate 420, which remained constant over a prolonged deposition time period. The temperature difference can be referred to as a thermal equilibrium process temperature increase or a process temperature increase.

Once the process temperature is determined, a second e-beam evaporation process can be performed in the same vacuum chamber (e.g., vacuum chamber 402) to apply a source material onto a substrate. In the second e-beam evaporation process, the deposition temperature can be set to a priori to the process temperature, which was determined during the first e-beam evaporation process with the sample source material and substrate. For example, a source material that is desired to be deposited onto a substrate and made of the same material as the sample source material (e.g., Ti and/or Sc) can be placed in crucible 406. Also, a substrate made of the same material as the sample substrate (e.g., Cu) can be placed on substrate dome 422. The source material (e.g., Ti and/or Sc) can be deposited onto the substrate (e.g., Cu), which is heated to the desired process temperature to form a thin metal film coated onto the substrate.

As an illustrative example, substrate 420 can be first placed in vacuum chamber 402 at an initial temperature (e.g., room temperature or 25° C.). During evaporation, the temperature of substrate 420 increases and remains constant (e.g., at 100° C.). Then, a process temperature is determined to be 100° C. for this particular setup. Next, the deposition temperature can be set a priori to 100° C. In other words, substrate 420 at 100° C. in the same vacuum chamber 402 can be used for an e-beam evaporation process to obtain a target. As previously mentioned, a process temperature can vary depending on the setup or the deposition environment including various process parameters (e.g., the geometry of vacuum chamber 402, the pressure within vacuum chamber 402, a deposition rate, one or more characteristics of substrate 420, one or more characteristics of source materials (e.g., Ti and/or Sc) and any other evaporation parameters, etc). In other words, depending on various process parameters, the kinetic energy associated with the e-beam evaporation may establish an inherent thermal environment that could be different from the process temperature. When the source material is deposited onto the substrate at the process temperature, the substrate temperature may not drift, and therefore, a dense thin metal film can be produced that may have the optimized performance as a target for a neutron generator. In some examples, a dense Ti film can have strong adhesion, which then allows additional metal layers (e.g., Sc) to be deposited on top of Ti to form a robust multi-layered target for a neutron generator.

Figure 5:
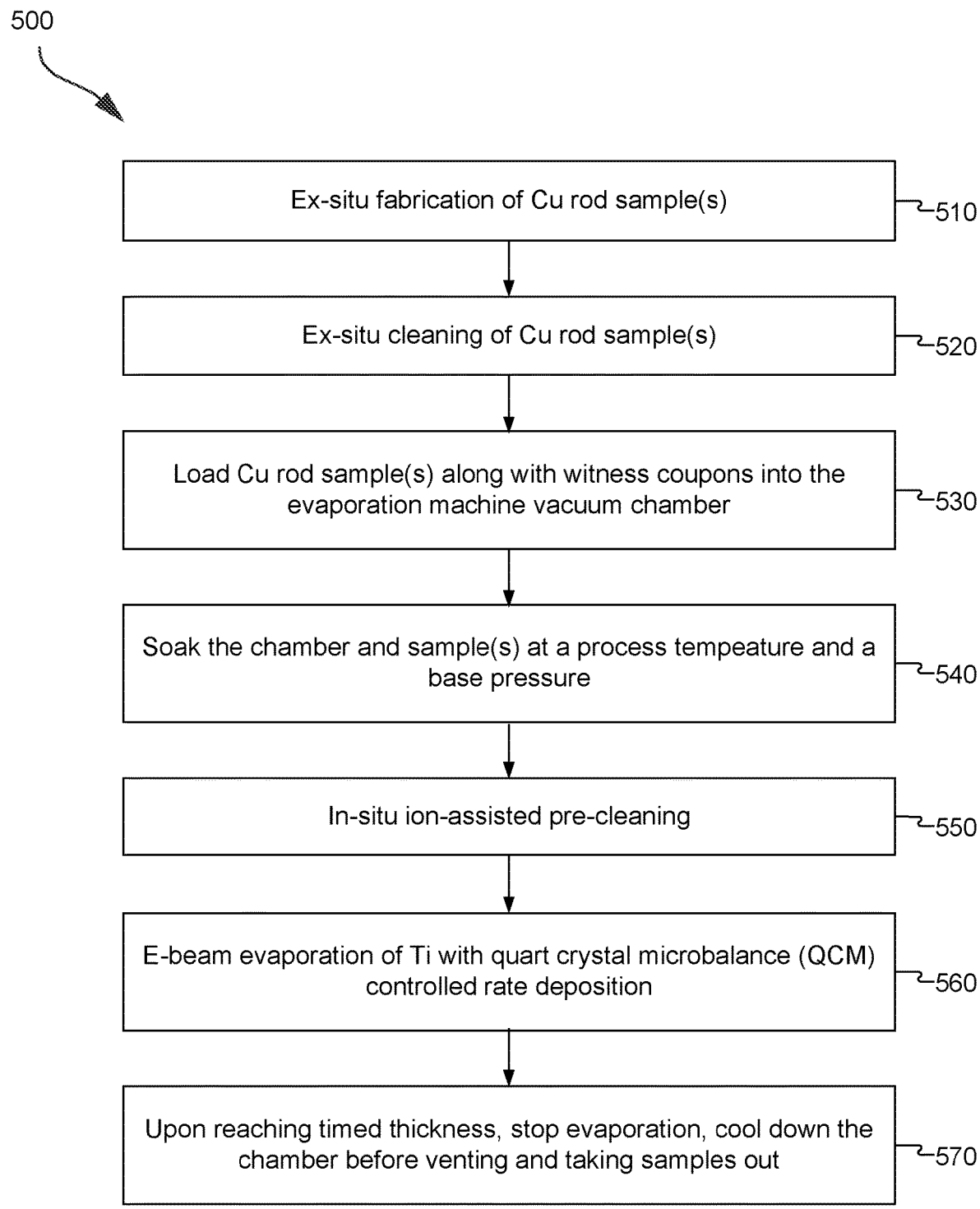
FIG. 5 is a flowchart illustrating an example process of applying Titanium onto a copper rod via an evaporation process, according to some aspects of the disclosed technology.

FIG. 5 is a flowchart illustrating an example process 500 for applying Ti onto a Cu structure via an e-beam evaporation process. Although example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence. As previously described, the systems and techniques of the present disclosure can optimize the deposition process that improves the quality of a film deposited on a copper structure as a target for a neutron generator by depositing the source material onto a substrate at a pre-determined process temperature.

At step 510, process 500 includes an ex-situ fabrication of a copper rod sample. For example, a copper rod (e.g., target rod 212 as illustrated in FIG. 2) that needs to be coated can be fabricated off-site. In some cases, the deposition surface of the copper rod can be polished to a desired machine finish (e.g., of 24-64 Ra with a lathe).

At step 520, process 500 includes an ex-situ cleaning of the copper rod sample. For example, the copper rod can be cleaned off-site by sonication in a methanol bath for a certain time (e.g., 30 minutes-1 hour).

At step 530, process 500 includes loading the copper rod samples along with witness coupons into an evaporation machine vacuum chamber. For example, the prepared copper rods can be placed into a vacuum chamber (e.g., vacuum chamber 402 as illustrated in FIG. 4) of an evaporation machine (e.g., e-beam evaporation machine 400) along with a witness coupon(s). In some examples, the witness coupon(s) can include substrates of glass or silicon wafers. The witness coupon(s) can allow in-situ measurement during the deposition process. In some examples, the witness coupon(s) can be in a standard shape (e.g., 3" diameter substrate) that is easy to measure in reflection or transmission mode spectrometry. Since a copper rod may not have the appropriate alignment or geometry that would allow in-situ characterization by spectroscopic methods, adding witness coupon(s) can be used for follow-up analysis of thin films (e.g., destructive analysis of thin films) while the copper rod after deposition of thin films can be reserved for the construction of a neutron generator.

At step 540, process 500 includes soaking the evaporation machine vacuum chamber and the copper rod samples at a process temperature and a base pressure. For example, the vacuum chamber (e.g., vacuum chamber 402) can be prepared to be set at a pre-determined process temperature (e.g., a thermal kinetic saturation point or a thermal equilibrium process temperature) and a pre-determined base pressure (e.g. $10^{-6}$ Torr). In some examples, the pre-determined process temperature can approximately arrange from 80° C. to 120° C. in a certain evaporation environment. However, a person of ordinary skill in the art will understand that a process temperature can vary depending on the evaporation environment (e.g., the geometry of the vacuum chamber, the pressure within the vacuum chamber, a deposition rate, one or more characteristics of a metal film (e.g., film target 210), one or more characteristics of the copper rod (e.g., target rod 212), and any other evaporation parameters, etc.).

At step 550, process 500 includes an in-situ ion-assisted pre-cleaning. For example, the vacuum chamber (e.g., vacuum chamber 402) can be prepared with ion-assisted pre-cleaning on-site for a certain time (e.g., 5 minutes).

At step 560, process 500 includes e-beam evaporation of Titanium (Ti) with quartz crystal microbalance (QCM) controlled rate deposition. For example, Ti (e.g., Ti placed in crucible 406 of e-beam evaporation machine 400) can be evaporated and deposited onto the copper rod at a QCM-controlled rate. For example, the deposition rate can range from 1 A/s to 30 A/s. In some examples, a QCM deposition monitor (e.g., crystal thickness monitor 440 as illustrated in FIG. 4, a crystal-type film thickness meter, etc.) monitors the thickness of the Ti film deposited onto the copper rod during the evaporation process and ensures that the Ti film is deposited at a desired thickness.

At step 570, process 500 includes suspending the evaporation upon reaching a timed thickness, cooling down the vacuum chamber before venting, and taking the copper rod samples and witness coupons out. For example, the evaporation process can be stopped when the thickness of the Ti film coated onto the copper rod reaches a pre-determined or timed thickness. After cooling down the vacuum chamber (e.g., vacuum chamber 402) for a few hours before venting, the copper rod can be taken out and can be used as a target of a neutron generator.

Figure 6:
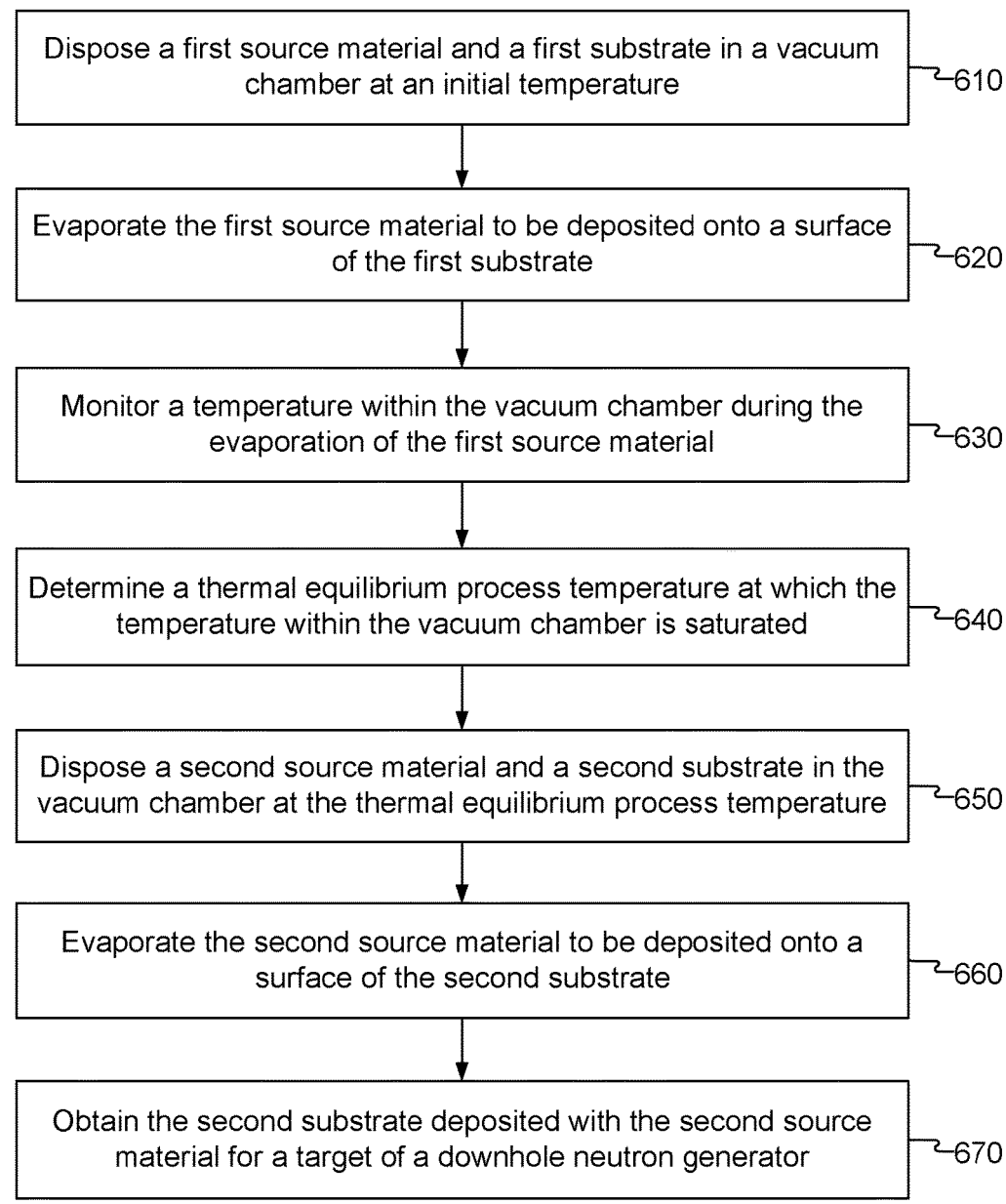
FIG. 6 is a flowchart illustrating an example process for optimizing the performance of a target of a neutron generator, according to some aspects of the disclosed technology.

FIG. 6 is a flowchart illustrating an example process 600 for optimizing the performance of a target of a neutron generator. Although example process 600 depicts a particular sequence of operations, the sequence may be altered without departing from the scope of the present disclosure. For example, some of the operations depicted may be performed in parallel or in a different sequence that does not materially affect the function of process 600. In other examples, different components of an example device or system that implements process 600 may perform functions at substantially the same time or in a specific sequence.

At block 610, process 600 can include disposing a first source material and a first substrate in a vacuum chamber at an initial temperature (e.g., a room temperature or any given temperature). For example, a first source material (e.g., Ti) and a first substrate (e.g., copper rod) can be placed in vacuum chamber 402 at a room temperature, or heated to a given temperature (e.g., by a heater 430 in vacuum chamber 402).

In some aspects, the first source material and the first substrate have different coefficients of thermal expansion. For example, Ti and Cu have different coefficients of thermal expansion (CTEs) that may result in the difficulty of having a solid adhesion between these two metals.

At block 620, process 600 can include evaporating the first source material to be deposited onto a surface of the first substrate. For example, Ti can be heated and evaporated to be deposited onto the surface of the copper rod to form a thin metal film. In some cases, the first source material is evaporated via an electron beam evaporation process. For example, Ti can be evaporated via an e-beam evaporation process as described with respect to FIG. 4 in e-beam evaporation machine 400.

At block 630, process 600 can include monitoring a temperature of the first substrate during the evaporation of the first source material. For example, during the evaporation of Ti (e.g., as Ti is deposited onto the surface of the copper rod), a temperature on the copper rod within vacuum chamber 402 can be monitored.

At block 640, process 600 can include determining a thermal equilibrium process temperature at which the temperature of the substrate is stabilized (e.g., remains constant). For example, when the temperature stops increasing and is stabilized (e.g., the temperature remains constant over a prolonged deposition period of time), the systems and techniques of the present disclosure determine such temperature as a thermal equilibrium process temperature.

At block 650, process 600 can include disposing a second source material and a second substrate in the vacuum chamber at the thermal equilibrium process temperature. For example, a second source material (e.g., Ti) and a second substrate (e.g., a copper rod) can be placed in vacuum chamber 402. The substrate can be heated (e.g., by a heater 430 in vacuum chamber 402), and the temperature can be set a priori to the thermal equilibrium process temperature.

At block 660, process 600 can include evaporating the second source material to be deposited onto a surface of the second substrate at the thermal equilibrium process temperature. For example, the second source material (e.g., Ti) can be heated and evaporated in vacuum chamber 402 so that the second source material (e.g., Ti) is deposited onto the surface of the copper rod to form a thin metal film. As previously mentioned, the evaporation process can be an e-beam evaporation process as described with respect to FIG. 4 in e-beam evaporation machine 400.

At block 670, process 600 can include obtaining the second substrate deposited with the second source material for a target of a downhole neutron generator. For example, after the evaporation process at block 660, the second substrate (e.g., a copper rod) deposited/coated with the second source material (e.g., Ti) can be obtained as a target (e.g., a target comprising film target 210 and target rod 212 of neutron generator 200 as illustrated in FIG. 2).

In some aspects, process 600 can include suspending the evaporation of the second source material in response to determining that a thickness of the second source material that is deposited onto the surface of the second substrate has reached a threshold. For example, the evaporation process of the second source material (e.g., Ti) can be stopped when the thickness of the target film (e.g., film target 210), which is the thickness of Ti deposited onto the surface of the copper rod reaches a threshold.

In some cases, the threshold is determined by tracking a frequency response of a quartz crystal during the evaporation process. For example, the thickness threshold can be monitored and determined by tracking a frequency response of a quartz crystal during the evaporation with crystal thickness monitor 440 (e.g., a quart crystal microbalance (QCM) deposition monitor, a crystal-type film thickness meter, etc.).

In some examples, the thermal equilibrium process temperature is a variable dependent on at least one of a geometry of the vacuum chamber (e.g., vacuum chamber 402), a pressure within the vacuum chamber (e.g., vacuum chamber 402), a deposition rate, one or more characteristics of the first and second source materials (e.g., Ti), one or more characteristics of the first and second substrates (e.g., a copper rod), and one or more parameters associated with evaporating the first and second source materials (e.g., Ti). When the source material is deposited onto the substrate at the process temperature, a dense thin metal film can be produced that may have the optimized performance as a target for a neutron generator. In some examples, a dense Ti film can have strong adhesion, which then allows additional metal layers (e.g., Sc) to be deposited on top of Ti to form a robust multi-layered target for a neutron generator.

In some examples, process 600 includes deploying a logging tool having the downhole neutron generator into a borehole. The target of the downhole neutron generator includes the second substrate deposited with the second source material. For example, downhole tool 126 that has neutron generator 200 can be deployed into a borehole. In some examples, neutron generator 200 can include the second substrate (e.g., copper rod) deposited with the second source material (e.g., Ti) as a target. In some examples, neutron generator 200 can include the substrate (e.g., copper rod) deposited with multiple source materials (e.g., Ti and Sc) as a multi-layered target.

Figure 7:
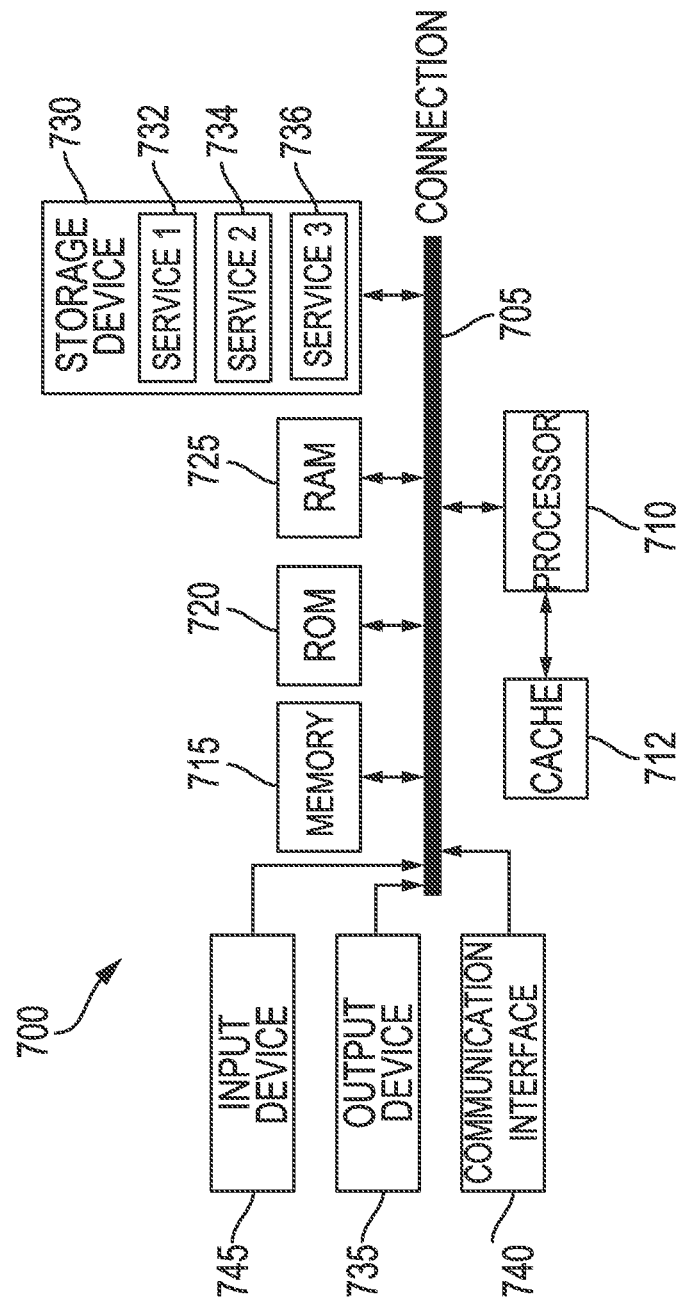
FIG. 7 illustrates an example computing device and hardware that can be used to implement some aspects of the disclosed technology.

FIG. 7 illustrates an example computing system 700 including components in electrical communication with each other using a connection 705 upon which one or more aspects of the present disclosure can be implemented. For example, depending on implementation, computing system 700 can be implemented at the surface or downhole. Additionally, it is understood that the computing system 700 can be implemented in both surface and downhole hardware, depending on the desired implementation. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

Storage device 730 can include software services, servers, services, etc., that when the code that defines such software is executed by processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Example 1. A method comprising: disposing a first source material and a first substrate in a vacuum chamber at an initial temperature; evaporating the first source material to be deposited onto a surface of the first substrate; monitoring a temperature of the first substrate during the evaporation of the first source material; determining a thermal equilibrium process temperature at which the temperature of the first substrate is stabilized; disposing a second source material and a second substrate in the vacuum chamber at the thermal equilibrium process temperature; evaporating the second source material to be deposited onto a surface of the second substrate; and obtaining the second substrate deposited with the second source material for a target of a downhole neutron generator.

Example 2. The method of Example 1, further comprising: suspending the evaporation of the second source material in response to determining that a thickness of the second source material that is deposited onto the surface of the second substrate has reached a threshold.

Example 3. The method of Example 2, wherein the threshold is determined by tracking a frequency response of a quartz crystal during the evaporation.

Example 4. The method of any of Examples 1 to 3, wherein the thermal equilibrium process temperature is a variable dependent on at least one of a geometry of the vacuum chamber, a pressure within the vacuum chamber, a deposition rate, one or more characteristics of the first and second source materials, one or more characteristics of the first and second substrates, and one or more parameters associated with evaporating the first and second source materials.

Example 5. The method of any of Examples 1 to 4, wherein evaporating the first and second source materials is based on an electron beam evaporation process.

Example 6. The method of any of Examples 1 to 5, wherein the first source material and the first substrate have different coefficients of thermal expansion.

Example 7. The method of any of Examples 1 to 6, wherein the first and second source materials include Titanium.

Example 8. The method of any of Examples 1 to 7, wherein the first and second source materials include Titanium and Scandium.

Example 9. The method of any of Examples 1 to 8, wherein the first and second substrates are a Copper rod.

Example 10. The method of any of Examples 1 to 9, further comprising: deploying a logging tool having the downhole neutron generator into a borehole, wherein the target of the downhole neutron generator includes the second substrate deposited with the second source material.

Example 11. A downhole neutron generator comprising: a cylindrical housing to be deployed within a borehole; a target comprising: a target rod co-axial with the cylindrical housing; and a film deposited onto a cross-sectional area of the target rod, wherein the film is deposited onto the cross-sectional area of the target rod by evaporating a source material of the film in a vacuum chamber at a thermal equilibrium process temperature, wherein the thermal equilibrium process temperature is determined based on: disposing a sample material and a sample substrate in the vacuum chamber at an initial temperature; evaporating the sample material to be deposited onto a surface of the sample substrate; monitoring a temperature of the sample substrate during the evaporation of the sample material; determining the thermal equilibrium process temperature at which the temperature of the sample substrate is stabilized; and an ion source to emit an ion beam towards the target rod co-axial with the cylindrical housing.

Example 12. The downhole neutron generator of Example 11, wherein a thickness of the film is determined by suspending the evaporation of the source material in response to determining that the thickness of the source material that is deposited onto the surface of the target rod has reached a thickness threshold.

Example 13. The downhole neutron generator of Example 12, wherein the thickness threshold is determined by tracking a frequency response of a quartz crystal during the evaporation.

Example 14. The downhole neutron generator of any of Examples 11 to 13, wherein the thermal equilibrium process temperature is a variable dependent on at least one of a geometry of the vacuum chamber, a pressure within the vacuum chamber, a deposition rate, one or more characteristics of the source and sample materials, one or more characteristics of the substrate and the target rod, and one or more parameters associated with evaporating the source and sample materials.

Example 15. The downhole neutron generator of any of Examples 11 to 14, wherein evaporating the source and sample materials of the film is based on an electron beam evaporation process.

Example 16. The downhole neutron generator of any of Examples 11 to 15, wherein the target rod and the film have different coefficients of thermal expansion.

Example 17. The downhole neutron generator of any of Examples 11 to 16, wherein the target rod is a Copper rod.

Example 18. The downhole neutron generator of any of Examples 11 to 17, wherein the film is a single layer of Titanium.

Example 19. The downhole neutron generator of any of Examples 11 to 18, wherein the film is a double layer of Titanium and Scandium.

Example 20. A method for operating a neutron generator for logging information, the method comprising: deploying a logging tool having a neutron generator into a borehole, wherein the neutron generator comprises: a cylindrical housing to be deployed within the borehole; a target comprising: a rod co-axial with the cylindrical housing; and a film deposited onto a cross-sectional area of the rod, wherein the film is deposited onto the cross-sectional area of the rod by evaporating a source material of the film in a vacuum chamber at a thermal equilibrium process temperature, wherein the thermal equilibrium process temperature is determined based on: disposing a sample material and a sample substrate in the vacuum chamber at an initial temperature; evaporating the sample material to be deposited onto a surface of the sample substrate; monitoring a temperature of the sample substrate during the evaporation of the sample material; determining the thermal equilibrium process temperature at which the temperature of the sample substrate is stabilized; and an ion source to emit an ion beam towards the rod co-axial with the cylindrical housing.

Example 21. A system comprising means for performing a method according to any of Examples 1 to 10.

What is claimed is:

1. A method comprising:
   disposing a first source material and a first substrate in a vacuum chamber at an initial temperature;
   evaporating the first source material to be deposited onto a surface of the first substrate;
   monitoring a temperature of the first substrate during the evaporation of the first source material;
   determining a thermal equilibrium process temperature at which the temperature of the first substrate is stabilized;
   disposing a second source material and a second substrate in the vacuum chamber at the thermal equilibrium process temperature;
   evaporating the second source material to be deposited onto a surface of the second substrate; and
   obtaining the second substrate deposited with the second source material for a target of a downhole neutron generator.

2. The method of claim 1, further comprising:
   suspending the evaporation of the second source material in response to determining that a thickness of the second source material that is deposited onto the surface of the second substrate has reached a threshold.

3. The method of claim 2, wherein the threshold is determined by tracking a frequency response of a quartz crystal during the evaporation.

4. The method of claim 1, wherein the thermal equilibrium process temperature is a variable dependent on at least one of a geometry of the vacuum chamber, a pressure within the vacuum chamber, a deposition rate, one or more characteristics of the first and second source materials, one or more characteristics of the first and second substrates, and one or more parameters associated with evaporating the first and second source materials.

5. The method of claim 1, wherein evaporating the first and second source materials is based on an electron beam evaporation process.

6. The method of claim 1, wherein the first source material and the first substrate have different coefficients of thermal expansion.

7. The method of claim 1, wherein the first and second source materials include Titanium.

8. The method of claim 1, wherein the first and second source materials include Titanium and Scandium.

9. The method of claim 1, wherein the first and second substrates are a Copper rod.

10. The method of claim 1, further comprising:
    deploying a logging tool having the downhole neutron generator into a borehole, wherein the target of the downhole neutron generator includes the second substrate deposited with the second source material.

11. A downhole neutron generator comprising:
    a cylindrical housing to be deployed within a borehole;
    a target comprising:
      a target rod co-axial with the cylindrical housing; and
      a film deposited onto a cross-sectional area of the target rod, wherein the film is deposited onto the cross-sectional area of the target rod by evaporating a source material of the film in a vacuum chamber at a thermal equilibrium process temperature, wherein the thermal equilibrium process temperature is determined based on:
        disposing a sample material and a sample substrate in the vacuum chamber at an initial temperature;
        evaporating the sample material to be deposited onto a surface of the sample substrate;
        monitoring a temperature of the sample substrate during the evaporation of the sample material;
        determining the thermal equilibrium process temperature at which the temperature of the sample substrate is stabilized; and an ion source to emit an ion beam towards the target rod co-axial with the cylindrical housing.

12. The downhole neutron generator of claim 11, wherein a thickness of the film is determined by suspending the evaporation of the source material in response to determining that the thickness of the source material that is deposited onto the surface of the target rod has reached a thickness threshold.

13. The downhole neutron generator of claim 12, wherein the thickness threshold is determined by tracking a frequency response of a quartz crystal during the evaporation.

14. The downhole neutron generator of claim 11, wherein the thermal equilibrium process temperature is a variable dependent on at least one of a geometry of the vacuum chamber, a pressure within the vacuum chamber, a deposition rate, one or more characteristics of the source and sample materials, one or more characteristics of the substrate and the target rod, and one or more parameters associated with evaporating the source and sample materials.

15. The downhole neutron generator of claim 11, wherein evaporating the source and sample materials of the film is based on an electron beam evaporation process.

16. The downhole neutron generator of claim 11, wherein the target rod and the film have different coefficients of thermal expansion.

17. The downhole neutron generator of claim 11, wherein the target rod is a Copper rod.

18. The downhole neutron generator of claim 11, wherein the film is a single layer of Titanium.

19. The downhole neutron generator of claim 11, wherein the film is a double layer of Titanium and Scandium.

20. A method for operating a neutron generator for logging information, the method comprising:
deploying a logging tool having a neutron generator into a borehole, wherein the neutron generator comprises:
a cylindrical housing to be deployed within the borehole;
a target comprising:
a rod co-axial with the cylindrical housing; and
a film deposited onto a cross-sectional area of the rod, wherein the film is deposited onto the cross-sectional area of the rod by evaporating a source material of the film in a vacuum chamber at a thermal equilibrium process temperature, wherein the thermal equilibrium process temperature is determined based on:
disposing a sample material and a sample substrate in the vacuum chamber at an initial temperature;
evaporating the sample material to be deposited onto a surface of the sample substrate;
monitoring a temperature of the sample substrate during the evaporation of the sample material;
determining the thermal equilibrium process temperature at which the temperature of the sample substrate is stabilized; and
an ion source to emit an ion beam towards the rod co-axial with the cylindrical housing.

* * * * *